United States Patent

Iwajima

[11] Patent Number: 5,854,979
[45] Date of Patent: Dec. 29, 1998

[54] PAGING SIGNAL TRANSMISSION EQUIPMENT FOR THE RADIO PAGING SYSTEM AND ITS SIGNAL TRANSMISSION METHOD

[75] Inventor: Yuuichi Iwajima, Tokyo, Japan

[73] Assignee: NEC Corporation, Tokyo, Japan

[21] Appl. No.: 561,259

[22] Filed: Nov. 21, 1995

[30] Foreign Application Priority Data

Nov. 22, 1994 [JP] Japan .................................. 6-287881

[51] Int. Cl.$^6$ ...................................................... H04Q 7/20
[52] U.S. Cl. ......................... 455/426; 455/31.2; 455/56.1
[58] Field of Search .................. 455/38.1, 51.2, 455/31.2, 56.1, 426; 340/825.44, 311.1; 370/232–233, 235, 412, 414; 379/57

[56] References Cited

U.S. PATENT DOCUMENTS

| | | | |
|---|---|---|---|
| 5,463,382 | 10/1995 | Nikas et al. | 340/825.44 |
| 5,526,368 | 6/1996 | Yun | 371/37.1 |
| 5,581,245 | 12/1996 | Nozaki | 340/825.52 |

FOREIGN PATENT DOCUMENTS

| | | |
|---|---|---|
| 0589288 | 3/1994 | European Pat. Off. . |
| WO91 10331 | 7/1991 | WIPO . |

Primary Examiner—Andrew Faile
Assistant Examiner—Vincent F. Boccio
Attorney, Agent, or Firm—Sughrue, Mion, Zinn, Macpeak & Seas, PLLC

[57] ABSTRACT

A paging signal transmission equipment and its signal transmission method having the capablity of increasing the rate of meaningful paging request signals to be transmitted within a time period of one transmission cycle are provided. The paging signal transmission equipment comprises the following parts: a paging request receiving part for receiving paging request signals; queuing buffers, each storing different form of paging request signals; a buffer selecting part for sorting the paging request signals to each form of signal and for distributing each form of paging request signal to a corresponding queuing buffer; counting circuits corresponding to each queuing buffer for counting the number of signals stored in the queuing buffer; a timer circuit for calculating a time period required for transmitting paging signals corresponding to paging request signals being stored in each queuing buffer, for instructing the buffer selecting part to stop reception of paging request signal when a time period calculated has reached to a time period of a transmission cycle; a transmission schedule part for receiving forms of paging signals to be transmitted in a period of the same transmission cycle from the timer circuit in each transmission cycle, for aligning each form of signal in a sequence to minimize insertion of dummy signals; a transmission switching part for outputting signals stored in each queuing buffer in the scheduled sequence; and a signal transmission part for converting paging request signals to paging signals to be transmitted.

16 Claims, 6 Drawing Sheets

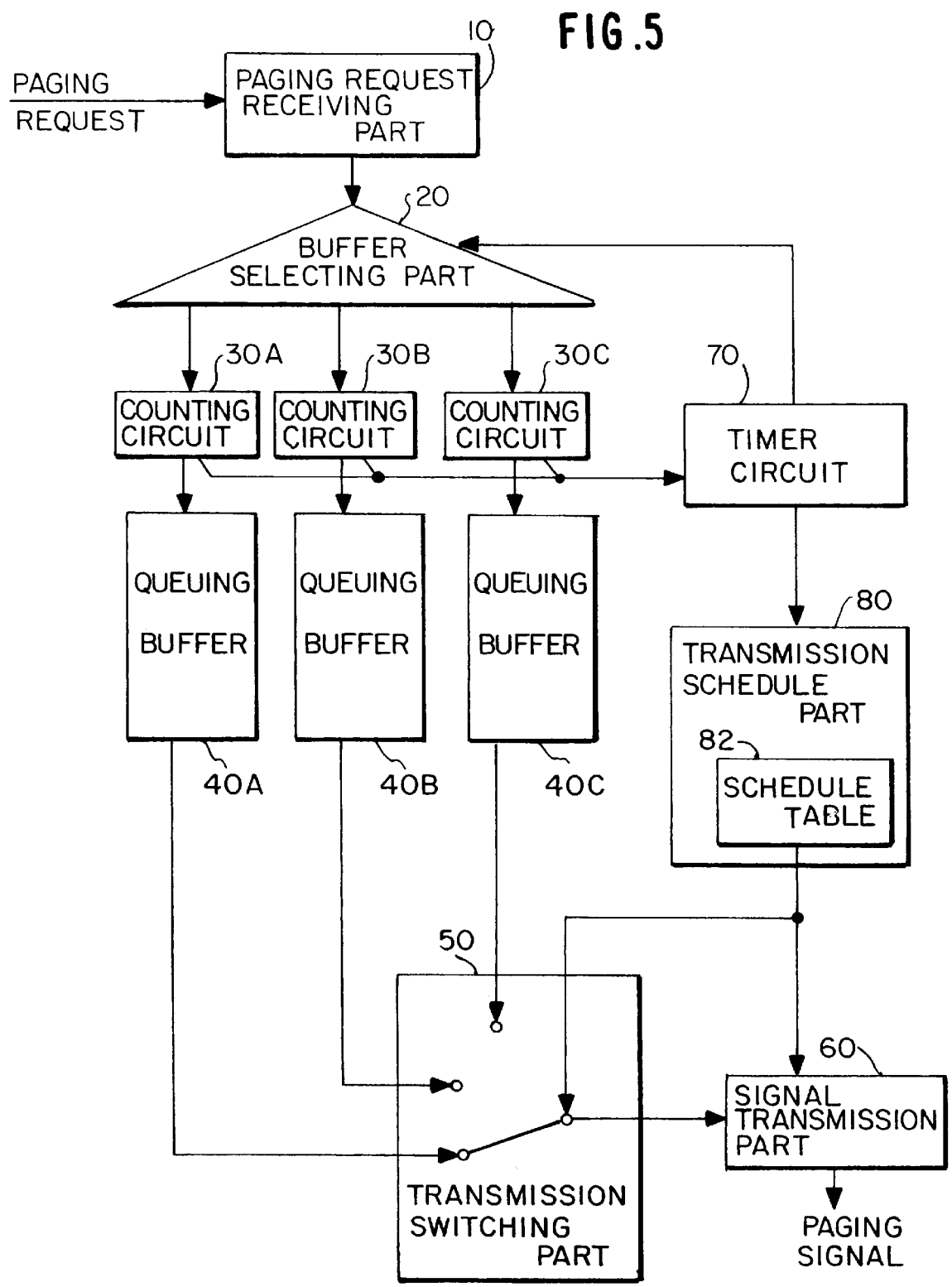

FIG.6
| NUMBER | SIGNAL GROUP | | | TRANSMISSION SEQUENCE (INCLUDING DUMMY SIGNAL) |
|---|---|---|---|---|
| | A | B | C | |
| 1 | 1 | 1 | 1 | A – B – C – c |
| 2 | 1 | 1 | 0 | A – B – b |
| 3 | 1 | 0 | 1 | C – c – A – a |
| 4 | 0 | 1 | 1 | B – C – c |
| 5 | 1 | 0 | 0 | A – a |
| 6 | 0 | 1 | 0 | B – b |
| 7 | 0 | 0 | 1 | C – c |
FIG.7(A)
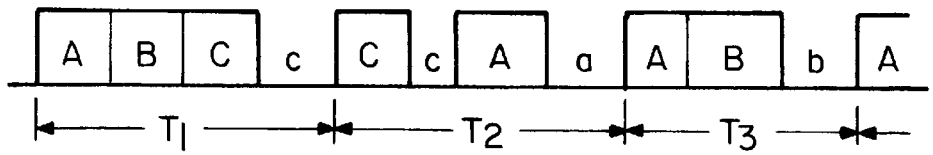
FIG.7(B) PRIOR ART
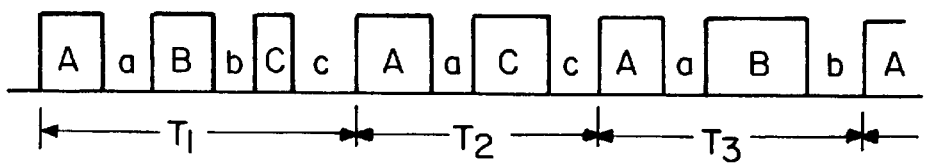

5,854,979

PAGING SIGNAL TRANSMISSION EQUIPMENT FOR THE RADIO PAGING SYSTEM AND ITS SIGNAL TRANSMISSION METHOD

BACKGROUND OF THE INVENTION

1. Field of the Invention

The present invention relates to paging signal transmission equipment for a radio paging system and its signal transmission method, and, more particularly, to paging signal transmission equipment and an alternate transmission method which receives paging request signals and converts those signals to paging signals having different data transmission speed, grouping those signals into signal groups having the same transmission speed and transmits different groups of signals in the same cycle of transmission interval efficiently.

2. Description of the Related Art

The radio paging system is a system which receives paging request signals sent through the public telephone network at a radio base station for paging each pager terminal, converts the paging request signal into a paging signal having a pager identifier of a pager terminal to be paged and short data for messages, and transmits the paging signal in the VHF frequency band of the radio signal. The pager terminal receives the paging signal containing its own pager identifier.

There are several types of paging signal transmission method for the radio paging system. Those are known as the pocket bell system defined by the NTT (Nippon Telgraph and Telephone corporation in Japan), the POCSAG system and the Golay system. For example, the paging signal employed in the POCSAG system is the FSK (Frequency Shift Keying) modulation, 512 bits/sec or 1200 bits/sec of data transmission speed and transmits a synchronization word followed by eight frames of data in the 150 MHz frequency band of the radio signal. Each pager terminal is assigned to one of eight frames and the paging signal receiving operation of the pager terminal is performed at the time of its own frame interval intermittently.

An alternate transmission method is also employed for efficient use of radio channels in the limited frequency band of the radio signal. The alternate transmission method is capable of transmitting paging signals having different data transmission speeds alternatively in the same radio channel, and this is realized by inserting dummy signals in the end of each group of paging signals. The dummy signal is used to remove synchronization of signal transmission which causes a receiving state of the pager terminal to remove for the purpose of battery saving. For example, in the POCSAG system, the paging signal group of 1200 bits/sec is followed by the dummy signal of 750 bits/sec, and the paging signal group of 512 bits/sec is followed by the dummy signal of 300 bits/sec. Each dummy signal repeats data of "one(1)" and "zero(0)" in the time period of two individual paging signals.

FIG. 1 shows schematic block diagram of the first conventional paging signal transmission equipment which has a capability of the alternate paging signal transmission, and consists of a paging request receiving part 1, a buffer selecting part 2, counting circuits 3A,3B,3C, corresponding to each queuing buffers 4A,4B,4C, a transmission switching part 5 and a signal transmission part 6.

This paging signal transmission equipment receives paging request signals sent through the public telephone network, which is not shown, at the paging request receiving part 1, discriminates each signal form including data transmission speed and distributes each signal to the appropriate queuing buffer at the buffer selecting part 2 and the signal group stored in the queuing buffer is transmitted by the signal transmission part 6 in the predetermined time interval switched at the transmission switching part 5.

In this first conventional paging signal transmission equipment, there is an upper limitation on the number of paging request signals to be stored in the queuing buffer because the number of signals to be transmitted in the predetermined time interval is limited depending on the data transmission speed, as shown in FIG. 3(A). FIG. 3(A) shows the maximum number of paging request signals to be stored in each queuing buffer as an example. They are "l", "m" and "n" respectively which are limited by the time interval of one transmission cycle of paging signals. Therefore, the counting circuit is provided for each queuing buffer for counting the number of signals being stored, and if the number has been reached to the maximum number to be stored, the counting circuit sends a blocking signal to the buffer selecting part 2 to stop reception of paging request signals. FIG. 3(B) shows that the number of paging request signals of the signal form A has reached its maximum number of "1".

As shown in FIG. 3(B), the first conventional paging signal transmission equipment is not efficient for transmitting paging signals because the paging request signal reception is stopped by only detection of full storage of one queuing buffer for signal form A, although other queuing buffers for signal forms B and C have not reached to their maximum number of storage.

FIG. 2 shows a schematic block diagram of the second conventional paging signal transmission equipment which has improved the problem in the first conventional paging signal transmission equipment shown in FIG. 1. The second conventional paging signal transmission equipment has a timer circuit 7 in addition to the first conventional paging signal transmission equipment. The timer circuit 7 counts the time required for transmitting paging signals being stored in each queuing buffer, and if the counted time has reached to the limited time of one transmission cycle, the blocking signal is sent to the paging request receiving part 1 from the timer circuit 7 to stop the paging request signal reception.

FIG. 4(A) shows an example in which the queuing buffer for the signal form A is storing the paging request signals more than "l" (there are "L" paging request signals) because the queuing buffers for other signal form (form B and form C) do not reach to their full capacity of storage. Similar example is also shown in FIG. 4(B) for the queuing buffer for the signal form B.

However, each of these conventional paging signal transmission equipment employs an alternate transmission method in which dummy signal is inserted in the end of each group of paging signals, for removing synchronization of signal transmission. Therefore, compared with a single transmission method, which only transmits a single group of signals, the alternate transmission method has a disadvantage in transmitting fewer meaningful paging request signals within the time of one transmission cycle because the transmitted signal includes more dummy signals.

SUMMARY OF THE INVENTION

The present invention provides a paging signal transmission equipment and its signal transmission method which is capable of increasing a rate of meaningful paging request signals to be transmitted within a time period of one transmission cycle for an alternate transmission method.

To attain such an object, the paging signal transmission equipment according to the present invention comprises a paging request receiving part for receiving paging request signals from a telephone network, a plurality of queuing buffers, each storing a different form of paging request signals, a buffer selecting part for sorting the paging request signals, received at the paging request receiving part, for each form of signal and for distributing each form of paging request signal its corresponding queuing buffer, a plurality of counting circuits, each being provided in correspondence with each queuing buffer for counting the number of paging request signals stored in corresponding queuing buffer, a timer circuit for calculating a time period required for transmitting paging signals corresponding to paging request signals being stored in each queuing buffer, for instructing the buffer selecting part to stop reception of paging request signal when a time period calculated has reached to a time period of a transmission cycle, a transmission schedule part for receiving forms of paging signals to be transmitted in a period of the same transmission cycle from the timer circuit in each transmission cycle, for aligning each form of signal in a sequence to minimize insertion of dummy signals for removing synchronization, a transmission switching part for outputting paging request signals stored in each queuing buffer in the scheduled sequence indicated by said transmission schedule part, and a signal transmission part for converting paging request signals, output through the transmission switching part, to paging signals to be transmitted.

In addition, the transmission schedule part comprises a schedule table for memorizing each alignment of signal forms to be transmitted in each transmission cycle, and the alignment is arranged to not repeat signals having a multiple relationship in their transmission speed to each other.

Furthermore, the signal transmission part comprises a means for inserting a dummy signal between paging signals having a multiple relationship in their transmission speed to each other, and for not inserting a dummy signal not between paging signals having a multiple relationship in their transmission speed to each other.

As for the method of paging signal transmission according to the present invention, it comprises the steps of receiving paging request signals at a paging request receiving part from a telephone network, sorting the paging request signal to each form of signal and distributing each form of signal to corresponding queuing buffer, calculating a time period required for transmitting paging signals corresponding to paging request signals being stored in each queuing buffer, instructing the buffer selecting part to stop reception of paging request signals when a time period calculated has reached to a time period of a transmission cycle, receiving forms of paging signals to be transmitted in a period of the same transmission cycle in each transmission cycle, aligning each form of signal in a sequence to minimize insertion of dummy signals for removing synchronization using a transmission schedule part, outputting paging request signals stored in each queuing buffer in the scheduled sequence indicated by the transmission schedule part, and converting paging request signals, output from the queuing buffer, to paging signals to be transmitted.

BRIEF DESCRIPTION OF THE DRAWINGS

FIG. 5 shows schematic block diagram of the paging signal transmission equipment of the present invention.

FIG. 6 shows an example of schedule table for signal transmission provided in the paging signal transmission equipment shown in FIG. 5.

FIG. 7(A) and 7(B) show examples of an alternate signal transmission in the present invention and the conventional method, respectively.

DETAILED DESCRIPTION OF THE PREFERRED EMBODIMENTS

Figure 1:
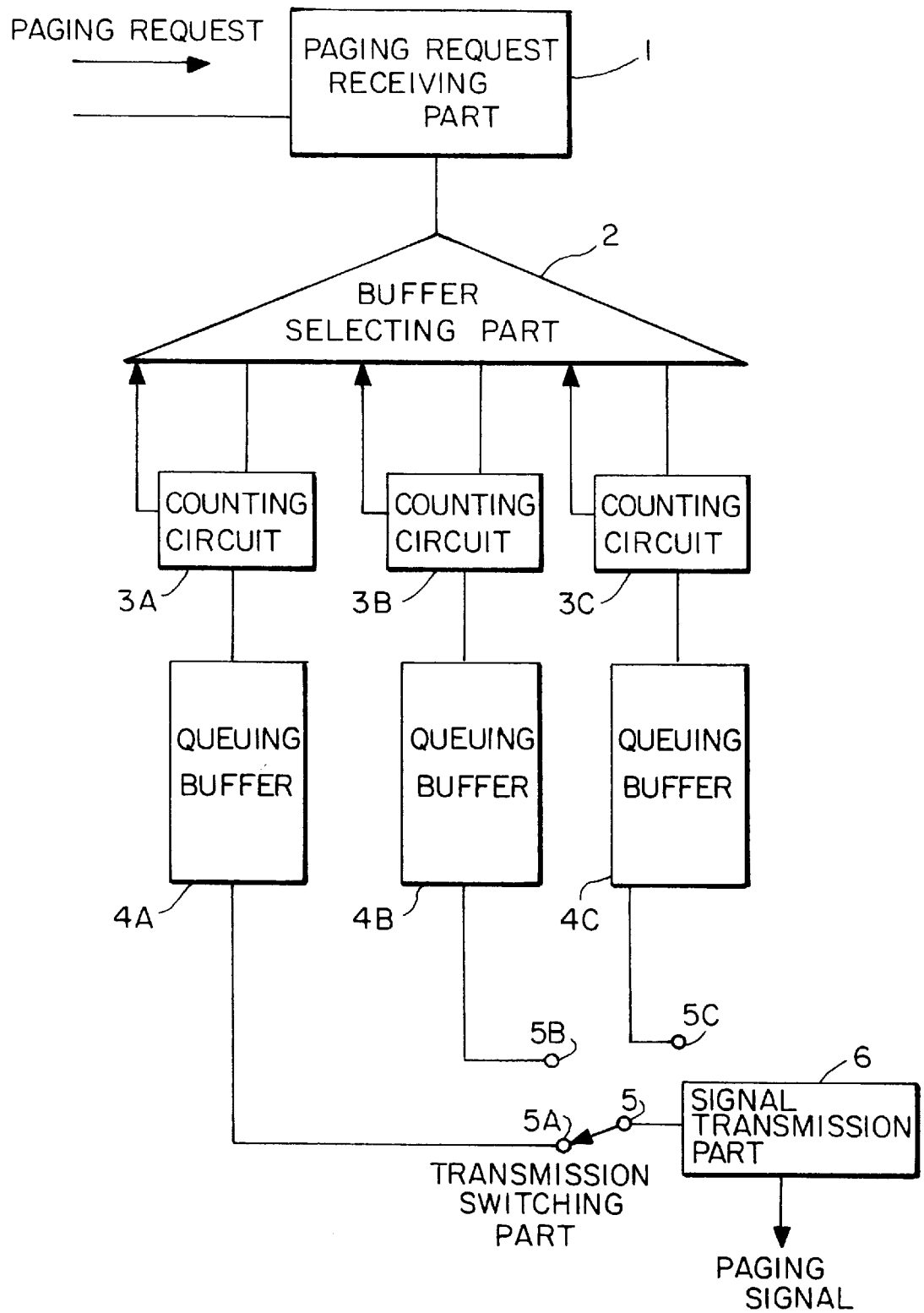
FIG. 1 shows schematic block diagram of the first conventional paging signal transmission equipment which has the capability of an alternate paging signal transmission.
Figure 2:
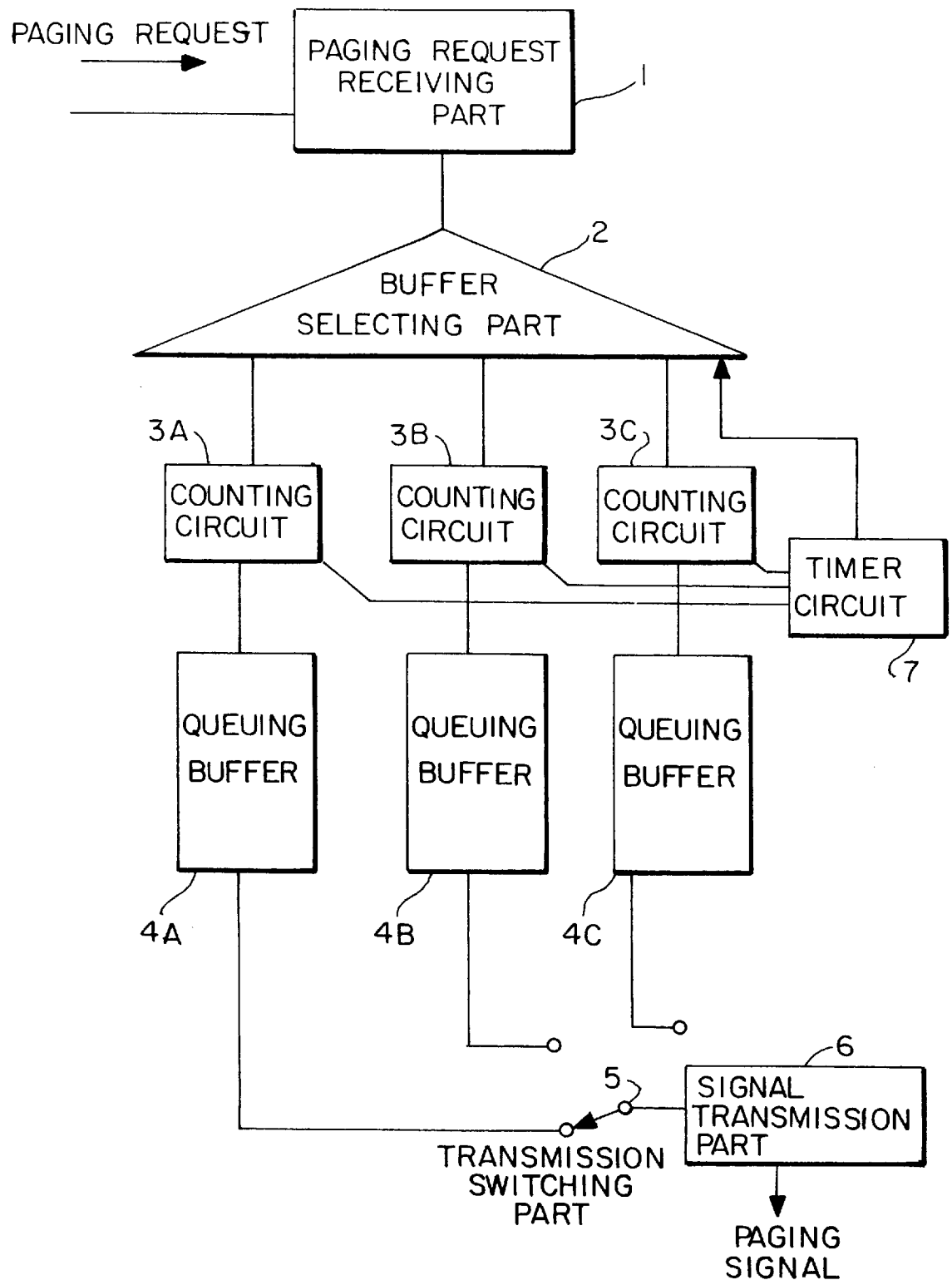
FIG. 2 shows schematic block diagram of the second conventional paging signal transmission equipment which has improved upon the problem of the first conventional paging signal transmission equipment shown in FIG. 1.
Figure 3A:
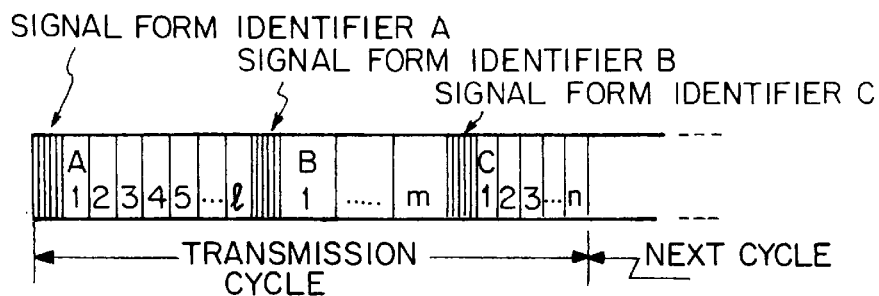
FIG. 3(A) shows upper number limitation of paging request signal to be stored in each queuing buffer for the first conventional paging signal transmission equipment shown in FIG. 1.
Figure 3B:
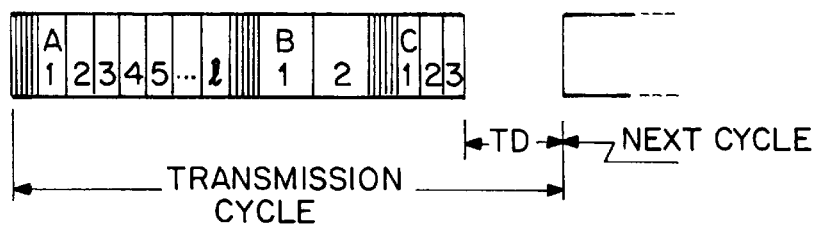
FIG. 3(B) shows an example of paging request signals being stored in each queuing buffer in which the queuing buffer for the signal form A has already been full and no more signal can be stored in other queuing buffers in the first conventional paging signal transmission equipment shown in FIG. 1.
Figure 4A:
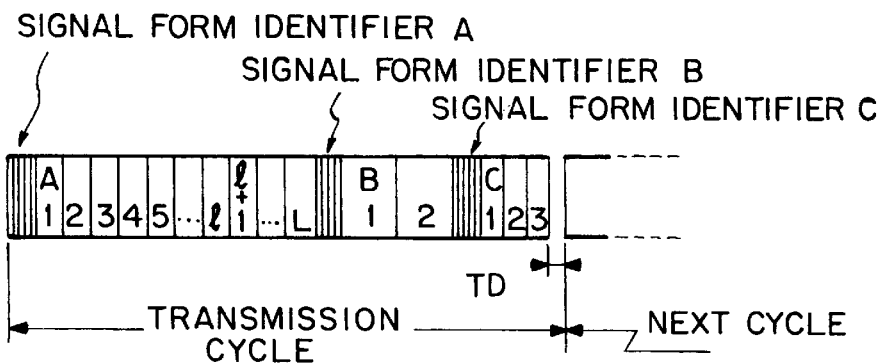
FIG. 4(A) and 4(B) show examples of paging request signals being stored in each queuing buffer which is capable of storing more than upper limitation number signals, as far as other queuing buffers have less number of signals, in the second conventional paging signal transmission equipment shown in FIG. 2.
Figure 4B:
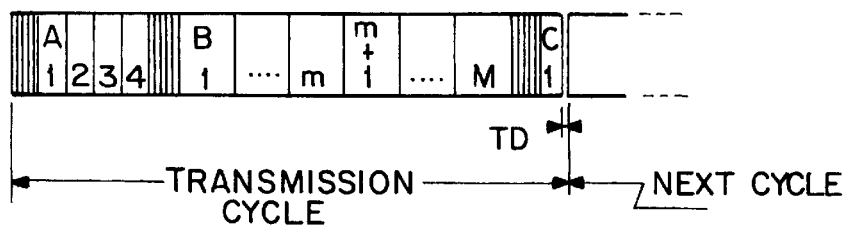

The present invention will be described in the following by referring to the attached drawings.

FIG. 5 shows schematic block diagram of the paging signal transmission equipment of the present invention.

This paging signal transmission equipment has the capability of the alternate paging signal transmission, and consists of a paging request receiving part 10, a buffer selecting part 20, counting circuits 30A,30B,30C, corresponding to each queuing buffers 40A,40B,40C, a transmission switching part 50, a signal transmission part 60, a timer circuit 70 and a transmission schedule part 80. The transmission schedule part 80 has a transmission schedule table 82.

This paging signal transmission equipment receives paging request signals sent through the public telephone network, which is not shown, at the paging request receiving part 10, discriminates each signal form including data transmission speed and distributes each signal to appropriate queuing buffer 40A,40B,40C at the buffer selecting part 20, and signal group stored in the queuing buffer is transmitted by the signal transmission part 60 in the predetermined time interval switched at the transmission switching part 50. The timer circuit 70 counts the time required for transmitting paging signals being stored in each queuing buffer, and if the counted time has reached to the limited time of one transmission cycle, the blocking signal is sent to the buffer selecting part 20 from the timer circuit 70 to stop the paging request signal reception.

Those configurations are similar to the conventional paging signal transmission equipment. However, the present invention consists of the the transmission schedule part 80 which controls insertion of dummy signals.

The transmission schedule part has a transmission schedule table as shown in FIG. 6. This schedule table shows signal transmission schedule including insertion of dummy signal depending on the signal storage state of queuing buffers for signal form A, B and C.

The signal storage state of each queuing buffer is shown in the column 86 labeled as "SIGNAL GROUP", and if the paging request signal is stored in a queuing buffer, numeral "1" is indicated in the corresponding column of A, B or C. Indication of numeral "0" means no paging request signal is being stored in the corresponding queuing buffer of the signal form. The transmission schedule part 80 receives this information from the timer circuit 70 in every transmission cycle.

The column 88 of "TRANSMISSION SEQUENCE" shows the transmission sequence in a time of one transmission cycle of signals including dummy signals corresponding to the signal storage state of each queuing buffer shown in the column 86. If the transmission speed of each signal are not in a multiple relationship from each other, it is not necessary to insert a dummy signal between those signals. Therefore, the transmission sequence can be so aligned to insert the dummy signals as minimum as possible by inserting only where necessary. In the example shown in FIG. 6, it is assumed that there is no multiple relationship between the signal transmission speeds of form A and form B, and form B and form C.

Therefore, as shown in FIG. 6, if all forms A, B and C of signals are being stored in the queuing buffers, the transmission sequence becomes "A-B-C-c" where "c" is the dummy signal for signal form C, and no dummy signal is inserted between signal form A and B, and form B and C. If form A and form B, or form B and form C of signals are being stored, the transmission sequence becomes "A-B-b", or "B-C-c" where "b" is the dummy signal for signal form B. If form A and form C of signals are being stored, the transmission sequence becomes "A-a-C-c" or "C-c-A-a" where "a" is the dummy signal for signal form A because in this case it is assumed that the multiple relationship exists between the signal transmission speeds of form A and form C. If only one form of signal is being stored, the transmission sequence becomes the signal and its dummy signal.

The transmission schedule part 80 selects the transmission sequence in the schedule table 82, and instructs the sequence to the transmission switching part 50 and the signal transmission part 60 for paging signal transmission in each transmission cycle.

Figure 8A:
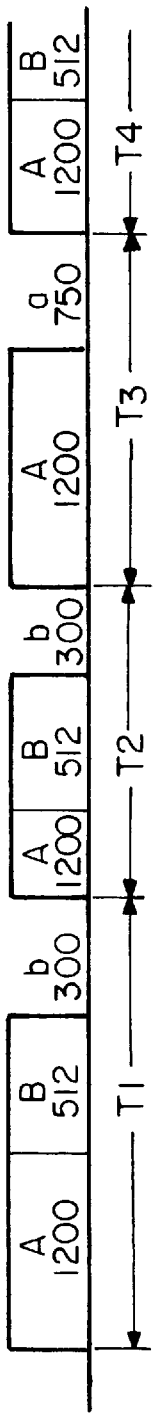
FIG. 8(A) and ((B) show examples of the alternate signal transmission using the POCSAG system in the present invention and the conventional method, respectively.
Figure 8B:
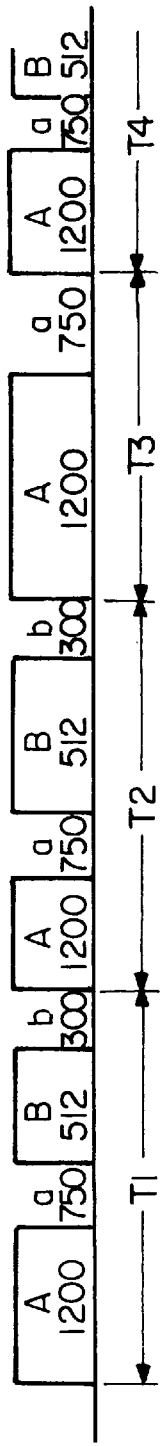

FIG. 7(A) and 7(B) show examples of an alternate signal transmission in the present invention and the conventional method, respectively, in several transmission cycles. FIG. 8(A) and (B) show examples of the alternate signal transmission using the POCSAG system in the present invention and the conventional method, respectively, in several transmission cycles. As is obvious from these figures, the present invention can increase the number of meaningful paging request signals to be transmitted in a same time period compared with the conventional method.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A paging signal transmission equipment having a capability of an alternate paging signal transmission which transmits a plurality of data in different transmission speeds to each other in a period of same transmission cycle, comprising:

a paging request receiving part for receiving paging request signals from a telephone network;

a plurality of queuing buffers, each storing different forms of said paging request signals;

a buffer selecting part for sorting said paging request signals received at said paging request receiving part to each form of said paging request signals and for distributing each form of said paging request signals to a corresponding one of said plurality of queuing buffers;

a plurality of counting circuits, each being provided in correspondence with each one of said plurality of queuing buffers, for counting the number of said paging request signals stored in each of said corresponding queuing buffers;

a timer circuit for calculating a time period required for transmitting paging signals corresponding to said paging request signals being stored in each of said queuing buffers and for instructing said buffer selecting part to stop reception of said paging request signals when a time period calculated has reached a time period of one transmission cycle;

a transmission schedule part for receiving forms of said paging request signals to be transmitted in a period of the same transmission cycle from said timer circuit in each transmission cycle, for aligning each form of said paging request signals in a sequence to minimize insertion of dummy signals for removing synchronization;

a transmission switching part for outputting said paging request signals stored in each of said plurality of queuing buffers in the scheduled sequence indicated by said transmission schedule part; and a signal transmission part for converting said paging request signals, output through said transmission switching part, to a paging signal to be transmitted.

2. A paging signal transmission equipment according to claim 1, wherein, said transmission schedule part comprises a schedule table for memorizing each alignment of said paging request signal forms to be transmitted in each transmission cycle, said alignment being arranged to not repeat signals having a multiple relationship in their transmission speed to each other.

3. A paging signal transmission equipment according to claim 2, wherein, said signal transmission part comprising a means for inserting said dummy signal between paging signals having a multiple relationship in their transmission speed to each other, and for not inserting said dummy signal between paging signals having no multiple relationship in their transmission speed to each other.

4. A method of paging signal transmission having a capability of an alternate paging signal transmission which transmits a plurality of data in different transmission speed to each other in a period of one transmission cycle, comprising steps of:

receiving paging request signals at a paging request receiving part from a telephone network;

sorting said paging request signals to each form of signal and distributing each form of said paging request signals to corresponding queuing buffer;

calculating a time period required for transmitting paging signals corresponding to said paging request signals being stored in each queuing buffer;

instructing said buffer selecting part to stop reception of said paging request signal when a time period calculated has reached to a time period of one transmission cycle;

receiving forms of paging signal to be transmitted in a period of one said transmission cycle in each transmission cycle;

aligning each form of said paging request signals in a sequence to minimize insertion of dummy signals for removing synchronization at a transmission schedule part;

outputting said paging request signals stored in each queuing buffer in the scheduled sequence indicated by said transmission schedule part; and converting said paging request signals, output from said queuing buffer, to a paging signal to be transmitted.

5. A paging signal transmission equipment having a capability of an alternate paging signal transmission which transmits a plurality of data in different transmission speeds relative to one another in a period of one transmission cycle, comprising:

a plurality of queuing buffers, each storing different forms of paging request signals;

a transmission schedule part for receiving forms of said paging request signals to be transmitted in a period of the same transmission cycle and aligning each form of said paging request signals in a predetermined transmission scheduled sequence to minimize insertion of dummy signals for removing synchronization, so that said dummy signal are inserted between said paging request signals having a multiple relationship in their transmission speed to each other, and said dummy signals are not inserted between said paging request signals not having said multiple relationship in their transmission speed to each other; and a transmission switching part, responsive to said transmission schedule part, for outputting said paging request signals stored in each of said plurality of queuing buffers in the predetermined transmission scheduled sequence indicated by said transmission schedule part.

6. A paging signal transmission equipment according to claim 5, wherein, said transmission schedule part comprises a schedule table for memorizing each alignment of said paging request signal forms to be transmitted in each transmission cycle, said alignment being arranged to not repeat signals having said multiple relationship in their relative transmission speed to each other.

7. A paging signal transmission equipment according to claim 6, further comprising:

a signal transmission part for converting said paging request signals, output through said transmission switching part, to a paging signal to be transmitted.

8. A paging signal transmission equipment according to claim 7, wherein, said signal transmission part comprises a means for inserting said dummy signals between paging signals having said multiple relationship in their transmission speed relative to each other, and for not inserting said dummy signal between paging signals not having said multiple relationship in their transmission speed relative to each other, in responsive to said transmission schedule part.

9. A paging signal transmission equipment according to claim 8, further comprising:

a buffer selecting part for sorting said paging request signals to each form of said paging request signals and for distributing each form of said paging request signals to a corresponding one of said plurality of queuing buffers;

a plurality of counting circuits, each being provided in correspondence with each one of said plurality of queuing buffers, for counting the number of said paging request signals stored in each of said corresponding queuing buffers; and a timer circuit for calculating a time period required for transmitting paging signals corresponding to said paging request signals being stored in each of said queuing buffers and for instructing said buffer selecting part to stop reception of said paging request signals when a calculated time period has reached a time period of one transmission cycle.

10. A paging signal transmission equipment according to claim 9, further comprising:

a paging request receiving part for receiving said paging request signals from a telephone network and providing said paging request signals to said buffer selecting part.

11. A paging signal transmission equipment having a capability of an alternate paging signal transmission which transmits a plurality of data in different transmission speeds relative to one another in a period of one transmission cycle, comprising:

a means for receiving and storing different forms of paging request signals in different memory locations;

a means for scheduling and outputting each of said different forms of paging request signals to be transmitted in a period of the same transmission cycle and aligning each form of said paging request signals in a predetermined transmission scheduled sequence to minimize insertion of dummy signals for removing synchronization, so that said dummy signal are inserted between said paging request signals having said multiple relationship in their transmission speed to each other, and said dummy signals are not inserted between said paging request signals not having said multiple relationship in their transmission speed to each other.

12. A paging signal transmission equipment according to claim 11, wherein said means for scheduling and outputting each of said different forms of paging request signals comprises a means for transmission switching for outputting said paging request signals stored in said receiving and storing means in the predetermined transmission scheduled sequence from a plurality of said different memory locations in said means for storing.

13. A method of paging signal transmission having a capability of an alternate paging signal transmission which transmits a plurality of data in different transmission speed to each other in a period of one transmission cycle, comprising the step of:

scheduling and outputting different forms of paging request signals to be transmitted in a period of the same transmission cycle and aligning each form of said paging request signals in a predetermined transmission scheduled sequence to minimize insertion of dummy signals for removing synchronization, such that said dummy signal are inserted between said paging request signals having said multiple relationship in their transmission speed to each other, and said dummy signals are not inserted between said paging request signals not having said multiple relationship in their transmission speed to each other.

14. A method of paging signal transmission according to claim 13, further comprising the step of:

storing said different forms of paging request signals in different memory locations to be scheduled and output according to said predetermined transmission scheduled sequence.

15. A method of paging signal transmission according to claim 14, wherein said step of storing said different forms of paging request signals in different memory locations includes sorting said paging request signals to each form of signal and distributing each form of said paging request signals to separate queuing buffers.

16. A method of paging signal transmission according to claim 15, further comprising the step of:

calculating a time period required for transmitting paging signals corresponding to said paging request signals being stored in each of said queuing buffers;

instructing a buffer selecting part to stop reception of said paging request signal when a time period calculated has reached a time period of one transmission cycle; and aligning each form of said paging request signals in a sequence to minimize insertion of dummy signals for removing synchronization at a transmission schedule part.

* * * * *

UNITED STATES PATENT AND TRADEMARK OFFICE
CERTIFICATE OF CORRECTION

PATENT NO. : 5,854,979
DATED : December 29, 1998
INVENTOR(S) : Yuuichi Iwajima

It is certified that error appears in the above-identified patent and that said Letters Patent is hereby corrected as shown below:

Please delete Column 3, lines 37-42, and insert

-- Furthermore, the signal transmission part comprises a means for inserting a dummy signal between paging signals having a multiple relationship in their transmission speed to each other, and for not inserting a dummy signal between paging signals not having a multiple relationship in their transmission speed to each other. --

Signed and Sealed this

Thirteenth Day of July, 1999

*Attest:*

Q. TODD DICKINSON

*Attesting Officer*   Acting Commissioner of Patents and Trademarks